United States Patent [19]

Stone et al.

[11] 3,727,462
[45] Apr. 17, 1973

[54] MOTION STABILIZED GRAVITY GRADIOMETER

[75] Inventors: Richard S. Stone, Lexington; Donald L. Sullivan, Concord; Peter C. Von Thüna, Lexington, all of Mass.

[73] Assignee: Arthur D. Little, Inc., Cambridge, Mass.

[22] Filed: Aug. 7, 1970

[21] Appl. No.: 62,110

[52] U.S. Cl. ................................................. 73/382
[51] Int. Cl. .............................................. G01v 7/14
[58] Field of Search ................... 73/382; 33/226 Z

[56] References Cited

UNITED STATES PATENTS

| | | | |
|---|---|---|---|
| 2,752,792 | 7/1956 | Draper et al. | 74/5.34 |
| 2,899,826 | 8/1959 | La Coste | 73/382 |
| 2,953,926 | 9/1960 | Wrigley et al. | 74/5.37 |
| 3,019,655 | 2/1962 | Graf | 73/382 |
| 3,033,037 | 5/1962 | Emmerich | 73/382 |

OTHER PUBLICATIONS

Klass "Inertial Guidance": Part II in Aviation Week Jan. 9, 1956

Primary Examiner—Richard C. Queisser
Assistant Examiner—Herbert Goldstein
Attorney—Bessie A. Lepper

[57] ABSTRACT

Method and apparatus for measuring gravity gradients directly. Two retroreflectors are caused to experience free flight, and the radiation reflected by these retroreflectors during free flight is directed to a radiation receiver which senses and measures the temporal variations of intensity of the interfering reflected radiation beams. The time rate of change of the frequency of the output signal of the receiver is directly related to the vertical gradient of gravity. The instrument of this invention has means to determine, and if desired correct for, deviations of the optical axis of the instrument from the local vertical, rotational motion of the instrument which will cause undesirable Coriolis accelerations and means to compensate for undesirable horizontal motion. This gravity gradiometer is particularly suitable for use aboard moving platforms such as ships, planes and helicopters.

9 Claims, 9 Drawing Figures

PATENTED APR 17 1973

INVENTORS
Richard S. Stone
Donald L. Sullivan
Peter C. von Thüna

BY

*Bernie A. Lepper*
Attorney

INVENTORS
Richard S. Stone
Donald L. Sullivan
Peter C. von Thüna
BY
Attorney

MOTION STABILIZED GRAVITY GRADIOMETER

This invention relates to a gravity gradiometer and more particularly to an instrument capable of providing a direct measurement of gravity gradient when mounted on a moving platform.

The determination of gravity gradients has long been known to be a very desirable way of sampling relatively large volumes of strata because of the simple dependence of the vertical gravity gradient of the density of the strata. As an example, the determination of gravity gradients may be widely used to detect the presence and to evaluate the extent of ore bodies and oil reserves beneath the surface of the earth. Direct-reading gravity gradiometers have been proposed. (See for example U.S. Pat. Nos. 2,618,156, 3,011,346, 3,095,744, 3,180,151 and 3,250,133.) However, the practical utility of such instruments is hindered by technical difficulties which are encountered in confined spaces such as boreholes or aboard moving platforms.

In addition to the use of a gravity gradiometer in such static-type measurements in boreholes and the like, the gravity gradiometer has great potential in surface prospecting in which gravity gradients are measured and plotted over a surface area, whether the area is land or water. On land, this may be done by stopping at predetermined points and making measurements. This same process may also, of course, be done on the water surface. However, this method of periodically stopping to determine gravity is a very expensive way of obtaining such measurements and often the terrain or sea conditions make such measurements hazardous or even impossible. This in turn has led to making gravity measurements over an area from an airplane or helicopter. Presently available instruments are, however, influenced by the motion of the airplane or helicopter and the "noise" resulting from such motion detracts from their useful sensitivity. Thus the use of a gravity gradiometer in general surface prospecting indicates that the instrument should be one which in its operation is independent of vehicle motion.

In a copending application, Ser. No. 25,153, filed Apr. 2, 1970, in the name of Richard S. Stone (now abandoned in favor of Ser. No. 62,008 filed Aug. 7, 1970) and assigned to the same assignee as this application, there is described a novel gravity gradiometer. In this gradiometer two retroreflecting bodies are caused to undergo free flight and the radiation reflected by the bodies during free flight is caused to interfere at a radiation detector. The detector output is a measure of the successive constructive and destructive interference between the two reflected beams as the separation between the retroreflecting bodies changes during free flight. The time rate change of frequency of the detector output signal is directly related to the vertical gradient of gravity. In another copending application Ser. No. 62,070, filed Aug. 7, 1970 in the name of Peter C von Thüna and assigned to the same assignee as this application, there is described an improvement of the instrument of Ser. No. 25,153, the improvement embodying, among other features, the use of one of the radiation reflecting bodies as a beam splitter.

The instruments of Ser. Nos. 25,153 and 62,070 are particularly well adapted for use in boreholes and other stationary or static-type measurements. However, when the instrument is mounted on a moving platform such as a ship or airplane which is moving relative to the earth and which may be subject to rolling, pitching and yawing, and which may experience linear accelerations and decelerations, it is necessary to give the gravity gradiometer additional degrees of freedom so that the systematic errors inherent in the use of a moving platform may be compensated for. The compensation for such systematic errors may take the form of sensing the errors and the development of appropriate signals which are used to effect the automatic direct and immediate adjustment of the instrument during the actual measurement of gravity gradient to substantially eliminate or minimize such systematic errors on the measurement of gravity gradient. Alternatively, the compensation for these systematic errors may take the form of sensing these errors, the recording of their magnitudes during the actual free flight of the retroreflectors and the subsequent use of error signals in calculating a corrected value of gravity gradient. Finally, a combination of these systems for error compensation may be used.

It is therefore a primary object of this invention to provide an improved apparatus for directly measuring gravity gradients from a moving platform. It is another object to provide an apparatus of the character described which in its operation from a moving platform is substantially free of systematic errors which may otherwise be caused by changes in the attitude of the platform and movement of the platform. An additional object of this invention is to provide a rugged and reliable gravity gradiometer which is particularly suitable for operation in an airplane, helicopter or ship, thereby providing means for general surface prospecting in a rapid and direct manner.

It is another primary object of this invention to provide a unique method of measuring gravity gradients directly while the platform from which the measurements are made is moving. It is yet another object to provide a method of the character described which is reliable and requires the minimum amount of operational skill. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a diagram illustrating the problems involved with aligning the instrument axis with the local vertical;

The gravity gradiometer of this invention employs two retroreflecting assemblies, one of which may be directly above the other (as disclosed in the above-mentioned Ser. No. 62,070) or both of which may be positioned to experience free flight through vertically parallel paths (as disclosed in the above-mentioned Ser. No. 25,153). These retroreflecting assemblies are caused to undergo free flight under gravity with vertical separation known at one point in time. Energy is furnished in the form of either a single beam of radiation or two beams derived from a single source of substantially coherent, and preferably monochromatic, radiation; and it is transmitted to the two retroreflectors which are experiencing free flight for reflection to a receiver/detector in such a way as to bring about optical interference. The receiver/detector measures the temporal variations of resultant intensity of the interfering reflected radiation beams. This temporal variation of the output signal of the detector will be substantially as diagrammed in FIG. 8. The time rate of change of the frequency of this signal is directly related to the vertical gradient of gravity. In the absence of a gravity gradient, that is, if the gravity is everywhere constant, a constant signal frequency anywhere from zero to a few thousand Hertz will be obtained, depending upon the relative initial velocity of the retroreflectors. In the presence of a gravity gradient, one of the retroreflectors experiencing free flight will be accelerated more than the other and the relative velocity of the retroreflectors will change with time. The signal frequency, which is a measure of relative velocity, will change at a rate directly proportional to the difference in gravity at the two retroreflector locations, and since the retroreflector separation will be nearly constant the frequency of the signal will be directly related to the gravity gradient.

Gravity measuring devices have been disclosed which use a single falling body and interferometric techniques. (See "An Absolute Interferometric Determination of the Acceleration of Gravity" by James E. Faller, Palmer Physical Laboratory, Princeton University, Princeton, N.J., March, 1963 and U.S. Pat. No. 3,429,184.) However, these devices are not capable of measuring gravity gradients directly nor are they capable of coping with systematic errors inherent in a gravity gradiometer carried on a moving platform such as an aircraft or ship. In addition to the systematic errors it is also necessary to cope in some manner with structural and optical design problems brought about through horizontal acceleration and deceleration of the moving platform. In the apparatus of this invention rotational and translational degrees of freedom are provided for the instrument to substantially eliminate the systematic errors and simplify the mechanical and optical design of the instrument.

Figure 1:
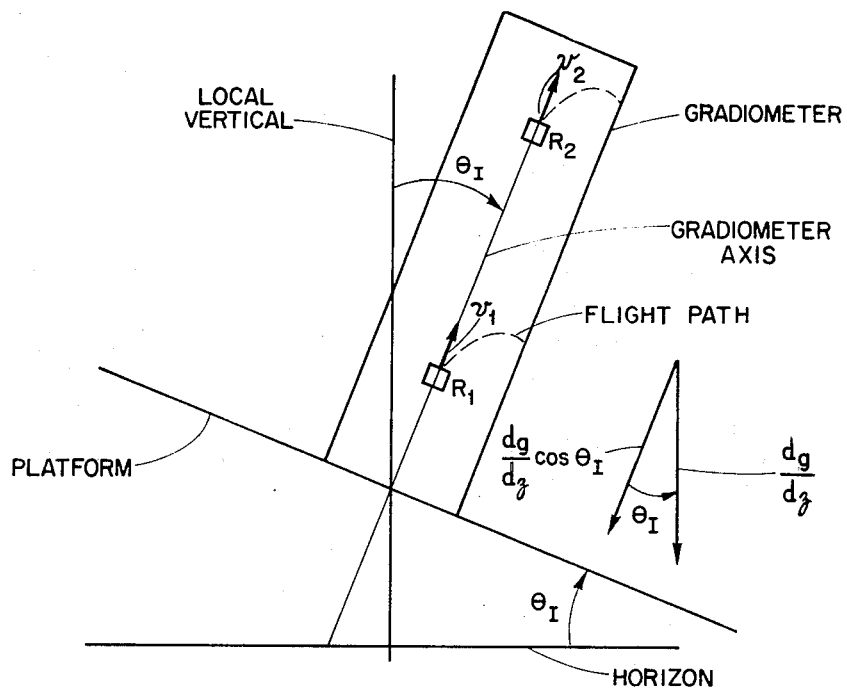
Figure 2:
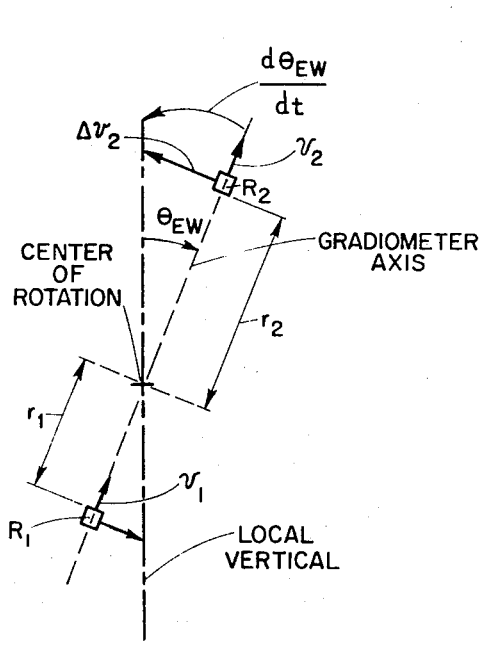
FIG. 2 illustrates the parameters involved in correcting for angular motion problems.
Figure 3:
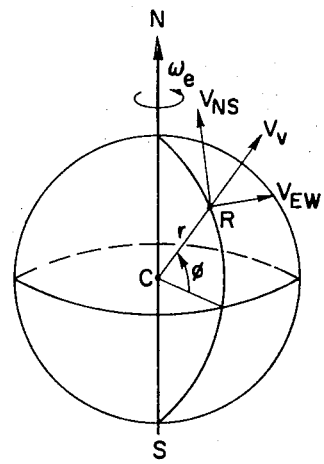
FIG. 3 is a diagram illustrating the various parameters involved in the Coriolis forces encountered.

Before describing the apparatus and method of this invention in detail, it will be helpful first to indentify these systematic errors and their causes with reference to FIGS. 1–3 which are simplified sketches illustrating the physical parameters involved in correcting for the errors introduced by the attitude of the platform and its motion relative to the earth (Coriolis effect). There are three primary systematic errors to be encountered and dealt with. The first of these, referred to hereinafter as the first systematic error, is proportional to the angular deviation, $\theta_I$, of the instrument axis from the local vertical in any direction; the second, hereinafter designated as the second systematic error, is proportional to the angular deviation, $\theta_{EW}$, in an East-West direction of the instrument axis from the local vertical; and the third error, hereinafter referred to as the third systematic error, is proportional to the time rate of change of the angular deviation, $d\theta_{EW}/dt$, of the instrument axis from the vertical in the East-West direction.

Turning first to FIG. 1, it will be seen how the attitude of the platform (angle formed with the horizon) can shift the optical axis out of alignment with the local vertical. It will be apparent that when the two retroreflectors $R_1$ and $R_2$ are put into free flight condition, they will in their upward and subsequent downward motion trace a parabolic flight path which will cause them to strike the side of the instrument housing. However, even if the lateral dimensions of the housing were large enough to eliminate this possibility, acceleration errors are introduced.

From FIG. 1 it will be seen that the first systematic error occurs because the basic measurement performed by the gradiometer is or the component of distance between $R_1$ and $R_2$ along the gradiometer axis. If the true value of gravity gradient at the time of measurement is $dg/dz$, the value of gradient sensed by the instrument is $(dg/dz) \cos \theta_I$. This measured value must be corrected to the true value either by forcing $\theta_I$ to be suitably small (angular stabilization of the instrument) or by recording the value of $\theta_I$ at the measurement time and subsequently adjusting the measured data, or by some combination of the two approaches.

The second and third systematic errors are due to the so-called Coriolis effect. Because the earth is rotating about its spin axis the Coriolis effect causes any body which is moving with velocity $\vec{v_R}$ with respect to the earth to experience acceleration proportional to $\vec{v_R}$. Turning to FIG. 3, which illustrates the coordinate parameters to be considered, the body R to be dropped will, of course, fall approximately toward the center C or the earth with an acceleration expressed as $$\vec{A} = \vec{g} - \vec{\omega_e} \times (\vec{\omega_e} \times \vec{r}) - 2\vec{\omega_e} \times \vec{v_R} \quad (1)$$

where $\vec{\omega_e}$ is the angular velocity of the earth and $\vec{r}$ is the position of the body with respect to the center of the earth.

The third term $$\vec{A_{cr}} = 2\vec{\omega_e} \times \vec{v_R} \quad (2)$$

is known as the Coriolis acceleration. The direction of the Coriolis acceleration is perpendicular to $\vec{\omega_e}$ and to $\vec{v_R}$ so that if $\vec{v_R}$ is resolved into East-West, North-South and vertical components, $\vec{v_{EW}}$, $\vec{v_{NS}}$ and $\vec{v_V}$, respectively, $\vec{v_{EW}}$ is the only component of $\vec{v_R}$ that produces a Coriolis acceleration with a component in the direction of the local vertical. Both North-South and vertical velocity components of $\vec{v}_R$ cause Coriolis acceleration in the East-West direction. The Coriolis acceleration component along the local vertical is $$A_{cr} = 2\omega_e v_{ew} \cos\phi \qquad (3)$$

where $\phi$ is the geographical latitude of the body.

During operation the instrument is maintained in substantial alignment with the local vertical. As a result of nonuniform aircraft (or other platform) motion, small angular motions can be imparted to the gradiometer, i.e., it will tend to swing in its mounting about some center of rotation such as is shown in FIG. 2.

The second systematic error therefore arises from a combination of non-zero relative velocity of the retroreflectors at the time of their release to experience free flight, and the angular deviation, $\theta_{EW}$, in the East-West direction of the gradiometer axis from the local vertical. If the initial retroreflector velocities are $v_1(o)$ and $v_2(o)$, the vertical component of relative Coriolis acceleration of the two retroreflectors is $$\Delta A_{cr} = 2\omega_e \sin\theta_{EW}[v_2(o) - v_1(o)]\cos\phi. \qquad (4)$$

The third systematic error is caused by differences in East-West velocity of the two retroreflectors arising from rotational motion of the gradiometer.

If the East-West component of aircraft velocity is $v_{A(EW)}$ and the East-West component of angular deviation of the gradiometer axis from the vertical is $\theta_{EW}$, then the vertical component of Coriolis acceleration for the first retroreflector is $$A_{cr_1} = 2\omega_e \left[\left(v_{A(EW)} + r_1 \frac{d\theta_{EW}}{dt}\right)\right] \cos\theta_{EW} \cos\phi \qquad (5)$$

and for the second retroreflector is $$A_{cr_2} = 2\omega_e \left[\left(v_{A(EW)} - r_2 \frac{d\theta_{EW}}{dt}\right)\right] \cos\theta_{EW} \cos\phi \qquad (6)$$

where $r_1$ and $r_2$ are the distances of the first and second retroreflectors from the point about which the gradiometer rotates.

The third systematic error, fully stated, is therefore $$\Delta A_{cr} = 2\omega_e \left[(r_1 + r_2)\frac{d\theta_{EW}}{dt}\right] \cos\theta_{EW} \cos\phi \qquad (7)$$

Note that the gradiometer is inherently insensitive to the large Coriolis accelerations of the individual retroreflectors caused by the platform (aircraft) speed $v_A$.

As in the case of the first systematic error, the second and third systematic errors can be substantially eliminated by forcing $\theta_{EW}$ and $d\theta_{EW}/dt$ to be suitably small, by recording the values of $\theta_{EW}$ and $d\theta_{EW}/dt$ at the time of retroreflector release and subsequently correcting the measured data, or by a combination of these two approaches.

In most instances it will also be desirable to provide for the substantial elimination of any operational difficulties or errors encountered by reasons of the horizontal acceleration or deceleration of the platform during the making of measurements. If the platform were to accelerate or decelerate in a horizontal direction while the retroreflectors were in free flight and the instrument housing were rigidly affixed to the platform it becomes apparent that the axis of the housing would move relative to the axis or axes along which the retroreflectors were traveling. Under these circumstances, the retroreflectors would eventually collide with the housing wall and it would not be possible to measure the gravity gradient. To make the housing sufficiently large in its lateral dimensions to prevent this would be to introduce undesirable limitations on the mechanical and optical design of the instrument.

The gravity gradiometer of this invention is provided with two rotational degrees of freedom and two translational degrees of freedom to adapt it for making accurate direct measurements of vertical gravity gradient from a moving platform. Provision of the rotational degrees of freedom makes it possible to substantially eliminate the systematic errors caused by the rotation of the instrument; and provision of the translational degrees of freedom materially simplifies the mechanical and optical design parameters of the instrument.

Figure 4:
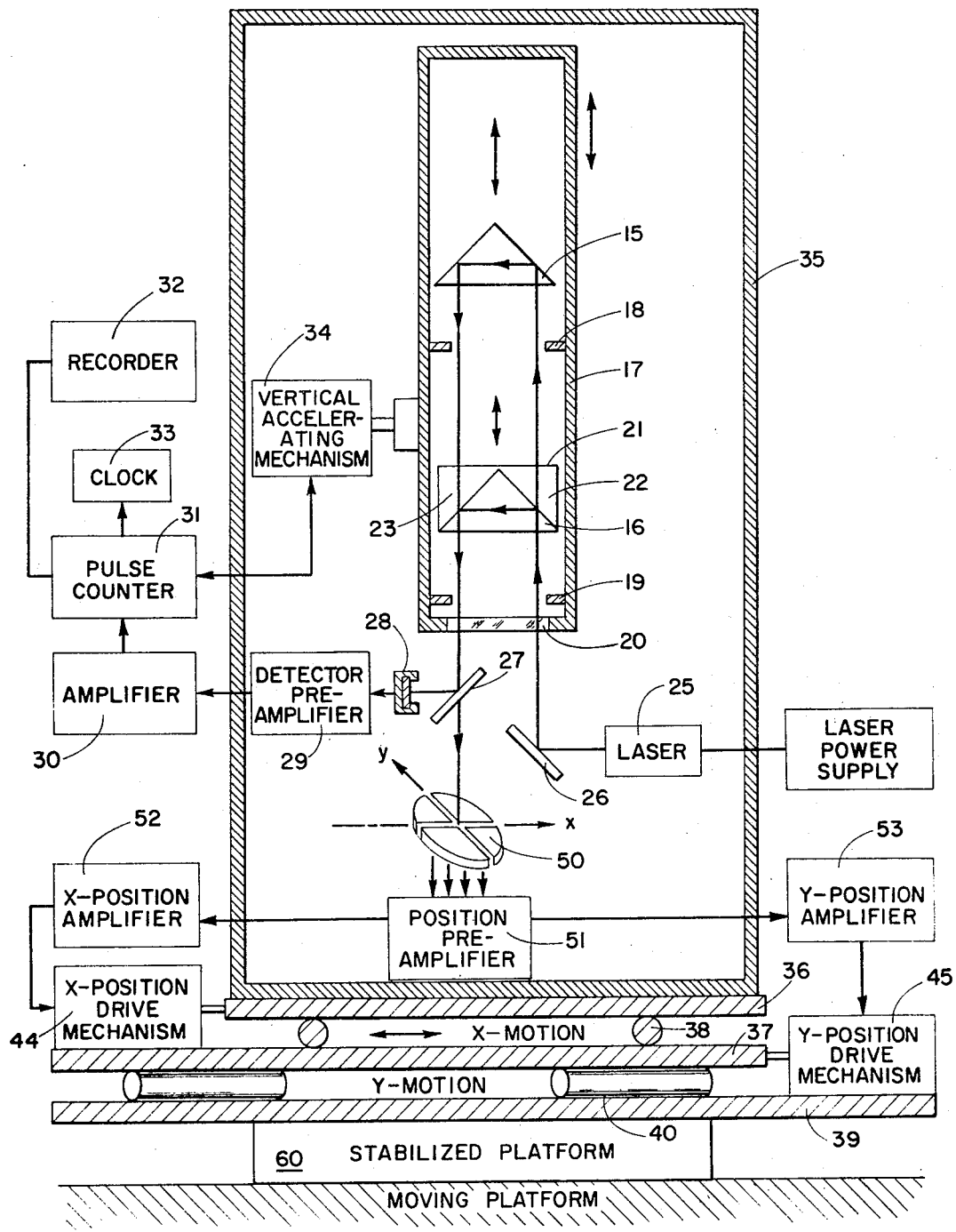
FIG. 4 is a diagrammatic longitudinal cross section of one embodiment of the apparatus of this invention in which the retroreflectors are positioned on a common axis and the lower retroreflector serves also as a beam splitter.

FIG. 4 is a cross sectional diagrammatical representation of the gradiometer of this invention. The basic gradiometer is constructed in accordance with the teaching of the above-identified Ser. No. 62,070, that is, the retroreflectors are aligned along a common axis and the lower retroreflector serves also as a beam splitter to make it possible to simplify the optics of the system. Also in the embodiment of FIG. 4 that portion of the apparatus designed to correct for systematic errors due to nonalignment of the instrument with the local vertical and for Coriolis effects operates to automatically stabilize the instrument to substantially eliminate these errors; and means are provided to substantially eliminate any effects of horizontal acceleration or deceleration of the platform on which the gravity gradiometer rests.

In the apparatus diagrammed in FIG. 4 the retroreflectors, which are shown for the sake of simplicity as corner cubes, experience free fall through two essentially equal distances which are defined between two distinctly different vertical positions, one being directly above the other. The term "retroreflector" is used herein to designate any optical device that will provide a reflected ray parallel and traveling in the opposite direction to an incident ray independent of the angular orientation of the retroreflector. The term "corner cube" hereinafter is used to means a retroreflector which is a geometrical figure having three orthogonal plane surfaces.

The corner cubes are put into their free flight condition by being propelled upwardly to their upper vertical levels by any suitable mechanism (not detailed) such as by a spring in tension or compression or a bellows in tension. In FIG. 4 the two retroreflecting corner cubes 15 and 16 experience their free flight within an evacuated acceleration carriage 17 which has internal annular cube supports 18 and 19 at two appropriate levels. A window 20 which is transparent to the radiation used serves as part of the bottom of the carriage. The residual gas pressure within the carriage should be low enough to substantially eliminate drag on the cubes.

The actual pressure used can readily be determined experimentally for any one set of conditions which include the use for the gravity gradiometer, the degree of accuracy desired, the configuration of the retroreflectors and the like. For many applications, pressures of about $10^{-4}$ torr should be sufficiently low. They may, of course, be lower. The lower corner cube is solid and is incorporated in an optical element 21 which is constructed according to the teaching of copending application Ser. No. 62,070. This optical element 21 serves as both a retroreflector and a beam splitter. The corner cube 16 is solid and the three pyramidal reflecting surfaces of the cube are coated for partial reflection and partial transmission of light. Adhered to these three partially reflecting-partially transmitting surfaces of the corner cubes are three optical elements, two of which are shown in cross section as 22 and 23, formed of a radiation-transmitting material having the same index of refraction as the material from which the corner cube is formed. The resulting retroreflecting beam splitter 21 may be triangular or circular in cross section. However, in any embodiment of the retroreflecting beam splitter, the resulting overall geometric configuration should be one which has a second flat surface which is parallel to the flat surface which forms the base of the corner cube.

If the upper retroreflector is a corner cube, it may be hollow or solid. The center of gravity of a hollow or solid corner cube does not generally coincide with its optical center, and therefore rotation of the corner cube during its free flight would produce spurious changes in the optical path unless corrective measures are taken. (See Craig and Rose, Applied Optics, 9:974 (1970).) The corner cube 15 will therefore be made part of an assembly which includes a suitable case for the corner cube and the resulting retroreflecting assembly will be designed to be weighted in such a manner as to shift the center of gravity of the retroreflecting assembly to coincide with the optical center of corner cube 15.

The upper retroreflector may be other than a corner cube, e.g., a convex lens held in a casing one focal length from a flat mirror, or a small, centrally-positioned flat mirror held in a casing spaced one focal length from a concave mirror.

A sudden movement of the acceleration carriage 17 propels the two retroreflecting corner cubes 15 and 16 upwardly to a maximum height which will be limited by the length of the carriage. The retroreflectors upon leaving their supports will be in condition to experience free flight upwardly and then back to their respective supports. During this free flight, radiant energy from a source such as laser 25 is transmitted by way of mirror 26 through window 20 to strike the retroreflectors and to be reflected back by them onto a beam splitter 27 which reflects a portion of the reflected beams to a radiation receiving system and transmits a portion of the reflected beams to a retroreflector position-determining system. The radiation receiving system which is used to measure gravity gradient through the interference of the two beams reflected by the two retroreflectors is shown in FIG. 4 to comprise a detector 28, e.g., a solid state photodiode or a photomultiplier tube, a preamplifier 29, an amplifier 30, an electronic pulse counter 31, a recorder 32 and an electronic clock 33. In the diagram of FIG. 4 the vertical accelerating mechanism 34 which propels the acceleration carriage 17 upwardly to place the retroreflecting cubes 15 and 16 in free flight is shown to be linked to the electronic pulse counter in a manner to activate the gravity gradient measuring mechanism when the cubes are put into free flight condition.

The accelerating carriage 17, its associated propelling means and the optical elements are located within a housing 35 which is affixed to a first flat support member 36 held in spaced relationship above a second flat support member 37 by means of roller bearings 38 so aligned to give the support member 26 and instrument housing 35 free movement in what is designated the x-direction. The second flat support member 37 is in turn held in spaced relationship above a third flat support member 39 by means of roller bearings 40 so aligned to give the entire assembly which they support free movement in what is designated as the y-direction. Associated with flat support member 36 is an x-position drive mechanism 44 adapted to move support member 36 over roller bearings 38; and associated with flat support member 37 is a y-position drive mechanism 45 adapted to move support member 37 over roller bearings 40. Exemplary of such drive mechanisms are pneumatic or hydraulic cylinders or electric motors with suitable gearing to provide linear motion.

Within housing 35 there is located a four-quadrant detector 50, such as is commercially available, positioned with respect to the incident beams reflected from the retroreflectors so that an equal amount of radiation strikes each of the quadrants when the axis of the beams reflected by the retroreflectors coincides with or is at a fixed distance from the axis of the carriage 17 and hence also from the axis of the instrument housing 35. Each of the four quadrants is connected to the position preamplifier 51 which is capable of receiving four different signals, two of which are responsive to movement of the incident reflected beams in the x-direction and two of which are responsive to movement of the incident reflected beams in the y-direction. The two signals associated with x-direction movement are transmitted to the x-position amplifier 52 and the two signals associated with the y-direction movement are transmitted to the y-position amplifier.

The lower flat support member 39 is in effect fixed to the moving platform, e.g., some portion of an aircraft frame, through the stabilized platform 60 (to be described below). Therefore, if the aircraft is linearly accelerated or decelerated transversely or longitudinally while the retroreflectors are in free flight, the consequent movement of the housing 35, along with the four-quadrant detector 50, with respect to the axis of the beams reflected by the retroreflectors will be detected by the detector 50 and the actual shifting of the housing 35 and carriage 17 with respect to the axis of these beams will be determined. Signals proportional to the amount of housing shift in both the x- and y-directions will be transmitted to the x- and y-position drive mechanisms, respectively, which will in turn impart the necessary translational motion to support members 36 and 37 to return the housing and the instrument components therein to a position wherein the axes of the beams reflected by the retroreflectors and the carriage again come into line. Thus by this mechanism, the instrument is given two translational degrees of freedom which in turn means that the carriage may be constructed to have essentially minimal lateral dimensions and the optics may be relatively simple.

Other systems capable of giving the instrument housing two translational degrees of freedom with respect to the moving platform in which it is carried may also be used. Such systems include, but are not limited to, four-point mechanical linkage mechanisms, air (or other fluid) bearings, and electromagnetic or hydraulic suspension systems. Note that the inertia of the instrument would alone suffice for elimination of linear accelerations or decelerations if the support mechanism were free of friction. The $x$- and $y$-position servomechanisms are required only to overcome friction.

The stabilized platform 60 in FIG. 4 is representative of one embodiment of a stable platform for maintaining the axis of the instrument aligned with the local vertical and for isolating the instrument from Coriolis forces, thereby in effect providing the two rotational degrees of freedom to correct for the three systematic errors previously identified and discussed. A stable platform may be defined as any device which will maintain a specific orientation or relationship with respect to a direction in space, in this case the local vertical. Stable platforms may be generally classed as of the "active" or passive type. The "passive" type of stable platform makes use only of inertial forces, such as those supplied by a rigidly coupled pendulum, for the maintenance of a particular orientation. The "active" type of stable platform, hereinafter referred to as a "stabilized platform" involves the use of electronic or other amplifying and feedback means to replace of supplement the passive means. The stabilized platform 60 of FIG. 4 is of the active type and several different modifications may be purchased commercially. As an example, a suitable stabilized platform based on the principle of the so-called "Schuler pendulum" is described in Aviation Week, 64: 42 et seq Jan. 9, 1956).

In addition to the use of an actively stabilized platform, the instrument may be aligned with the local vertical and isolated from the Coriolis forces through the use of a passive-type stabilized platform such as any one of the well-known pendulous suspension systems which suspends the instrument above its center of mass. Illustrative of such pendulous suspension systems are a single-point suspension, a gimbal suspension or a liquid bouyant suspension. The pendulous suspension systems may be combined with means for imparting two translational degrees of freedom as described above.

Figure 6:
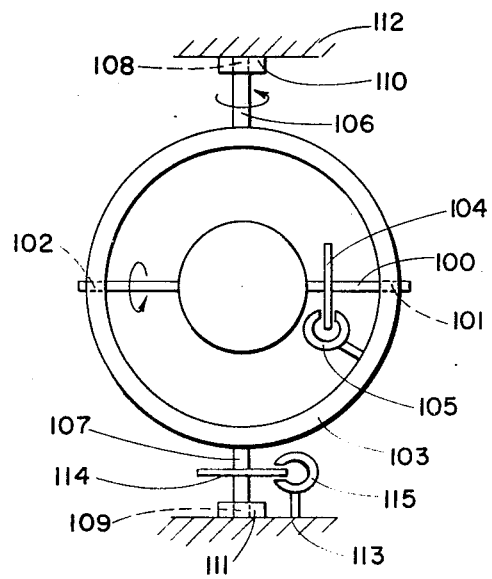
FIG. 6 and 7 are top plan and elevational views of a pendulous suspension used as a stable platform.
Figure 7:
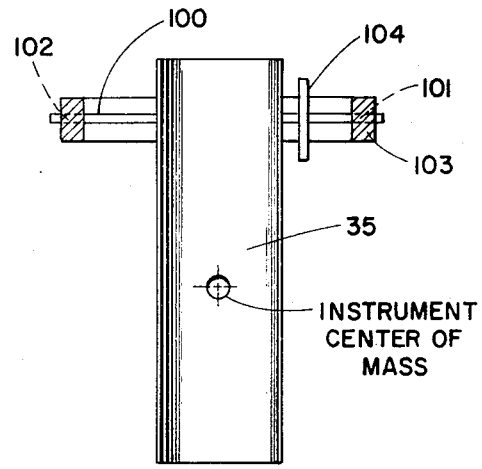

FIGS. 6 and 7 illustrate one embodiment of a passive type stable platform wherein the gravity gradiometer is suspended by a pendulous suspension at a point above its center of mass in a gimballed arrangement allowing the instrument 2 rotational degrees of freedom. A shaft 100, which is rigidly attached to instrument housing 35 is rotatably mounted by means of low-friction bearings 101 and 102 in gimbal ring 103. Associated with Shaft 100 is an eddy current damping means shown to comprise a damping disc 104 and a permanent magnet 105. The gimbal ring has affixed thereto two mounting shafts 106 and 107 which rotate in low-friction bearings 108 and 109, respectively, mounted in bearing supports 110 and 111 which are affixed to suitable support members 112 and 113 anchored to the moving platform, e.g., as aircraft. Associated with shaft 107 is a second damping means shown to comprise a damping disc 114 and a permanent magnet 115. It will, of course, be apparent that other damping means, e.g., fluid damping means etc., may be used and that, furthermore, FIGS. 6 and 7 represent but one of a number of passive-type stable platforms which are suitable for the practice of this invention.

Figure 5:
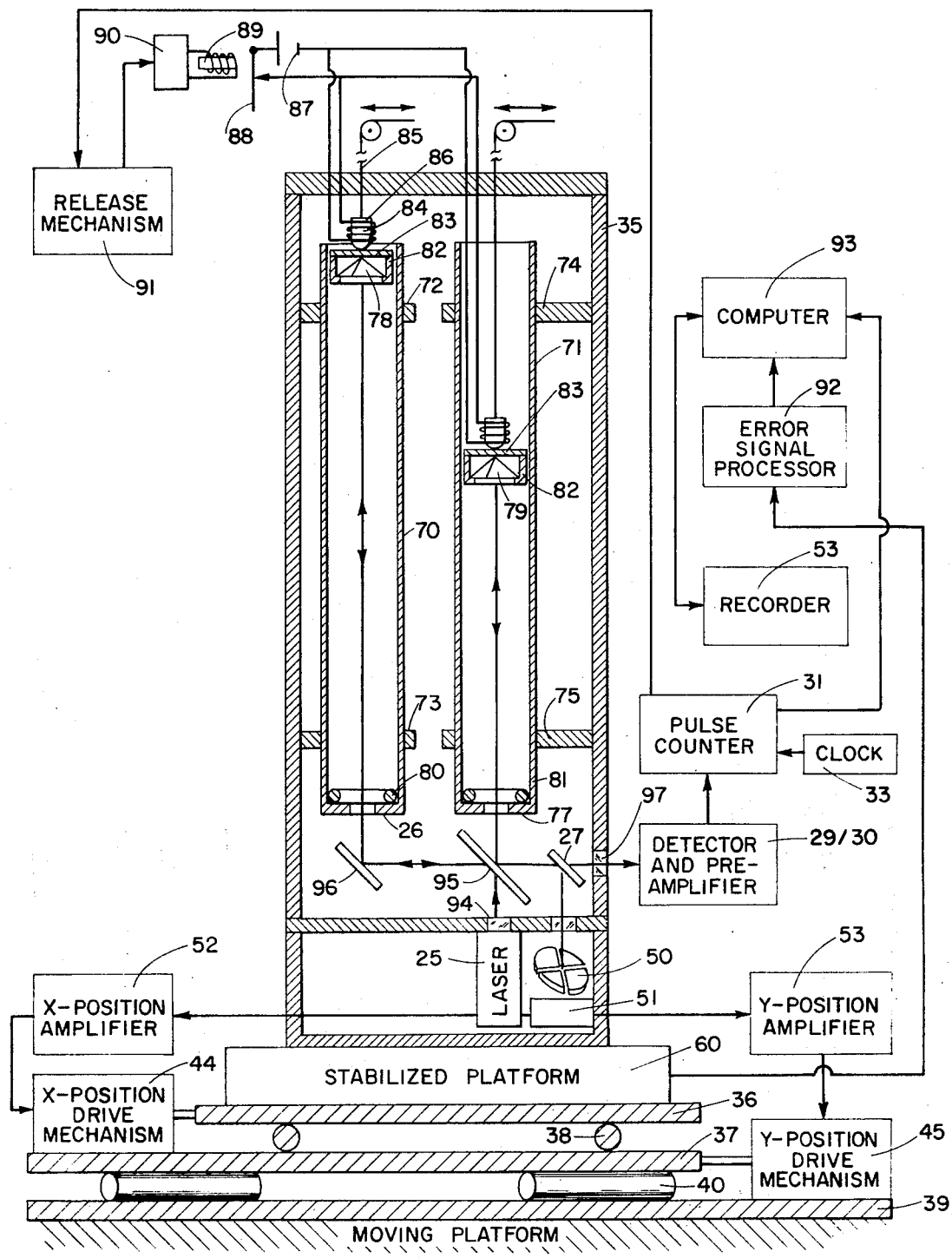
FIG. 5 is a diagrammatic longitudinal cross section of another embodiment of the apparatus of this invention in which the retroreflectors experience free flight on separate axes.

In the embodiment of the apparatus diagrammed in FIG. 5 and constructed in accordance with this invention, the instrument housing is placed directly on the stabilized platform 60 and signals generated by the stabilized platform which are representative of the deviations of the instrument from the desired orientation are transmitted to a computer for any additional corrections which may have to be applied to the measurements made.

In the apparatus of FIG. 5 like reference numerals are used to refer to like components in FIG. 4 and the optics of the system are drawn in simplified form inasmuch as a number of suitable optical systems to meet the requirements for the apparatus are possible. Within the evacuated housing 35 are positioned two free fall wells 70 and 71. These wells are conveniently thin tubular members; well 70 being affixed to the inner wall of housing 35 by upper support 72 and lower support 73 and well 71 by upper support 74 and lower support 75. The wells terminate in annular rings 76 and 77, these rings serving to stop the fall of the two retroreflecting corner cubes 78 and 79. Padding rings 80 and 81 resting on rings 76 and 77, serve to cushion the impact of the falling bodies. Each of the retroreflectors is held in a nonmagnetic ring 82 which is flanged inwardly on the bottom and to the top of which is attached a disk 83 of a magnetizable material such as steel. Each retroreflector is supported in the position shown by a magnet core 84 which in turn is suspended from a wire 85 adapted to be raised and lowered by any suitable external means. Associated with each magnet core 84 is a coil 86 which is part of a circuit including a dc power source such as battery 87 and an electronically operated relay contact 88. The contact 88 is in turn controlled by a relay 89 and an electronic trigger circuit 90 which is actuated by a release mechanism 91, all well-known electronic components.

Radiation from laser 25 is transmitted through window 94 and then to beam splitter 95 which directs essentially one-half of the radiation to corner cube 78 by way of reflector 96 and essentially one-half to corner cube 79. The reflected beams are directed to the detector and preamplifier by beam splitter 95 and then through beam splitter 27 and window 97.

In an active-type stable platform such as the stabilized platform 60, signals are generated which are representative of the direction and magnitude of the deviations in orientation, $\theta_l$, $\theta_{EW}$ and $d\theta_{EW}/dt$, responsible for the three systematic errors; while in the passive-type stable platform such as a pendulous suspension these deviations may be detected and measured by suitable known gyroscope and electronic mechanisms and represented as appropriate error signals. There are three techniques for using the error signals generated and measurable from the stable platform. The signals may be used in a feedback system which provides the only means for minimizing the effect of the systematic errors; the signals may be used in a feedback system and simultaneously recorded to be applied as possible further corrections in the data obtained; and, without feedbacks, the signals may be recorded and applied as errors to be corrected in the calculation of the gravity gradient from the data obtained from the interference signals.

The apparatus of FIG. 4 illustrates this first technique which is satisfactory if the stabilized platform 60 is of such a character that the residual errors are acceptably small and need not be applied to the calculation of the final gravity gradient values. In the case of the pendulous suspension devices, feedback and error correction is inherent in the devices. These, too, may be constructed to apply this first technique.

However, it is expensive to construct an active-type stable platform for use in this first technique and the equipment required to construct a passive-type stable platform which requires no error corrections may be unduly large and bulky. Therefore, the second technique using a combination of feedback and error signal recording such as shown in FIG. 5 may be generally more desirable. In this embodiment, signals generated in the stabilized platform 60, or measured in the operation of a passive pendulous suspension, such as shown in FIGS. 6 and 7, are transmitted to a suitable error signal processor 92 for subsequent transfer to any suitable device such as computer 93 capable of applying any detectable systematic errors to the calculation of the output from the pulse counter 31 to obtain a true measurement of gravity gradient. From a knowledge of the aircraft headings, the East-West components of these signals may be resolved and by knowing the orientation of the instrument at the time of a measurement it is possible to calculate the East-West tilt and rate of tilt. Signals are also available for determining the initial signal frequency to provide for the determination of the initial relative velocity of the retroreflectors. These signals may all be recorded or introduced into the computer to calculate the necessary corrections to the measured gradient of gravity. A third technique is to have the instrument have its optical axis fixed with respect to the moving platform (aircraft or ship) and have means provided for sensing, measuring and recording signals proportional to initial relative velocity. $\theta_I$, $\theta_{EW}$ and $d\theta_{EW}/dt$ for subsequent transfer to any suitable means for calculating corrected gravity gradient values.

In the operation of the apparatus shown, when the two retroreflectors begin their free flights the radiation which reaches them from laser 25, or other suitable source, is reflected back to the detector 29 which senses the net radiation intensity of the two interfering beams and transmits this signal via preamplifier 30 to the pulse counter 31 and a suitable recording means 53 such as digital recorder. All of these components are well-known and commercially available. Their use in conjunction with a detector is also well-known and it is well within the skill of the art to incorporate them in one or another type of circuit to obtain the information in a desired form.

Figure 8:
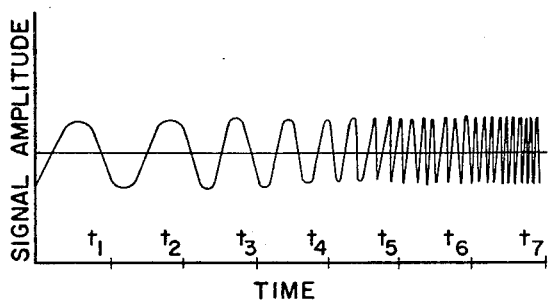
FIG. 8 is an exemplary plot, not to any scale, of Time versus Signal Amplitude determined by the detector.
Figure 9:
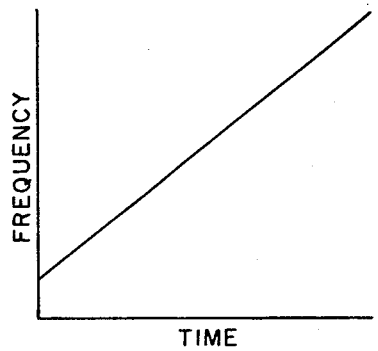
FIG. 9 is a plot of Time versus Interference Signal Frequency showing the direct measurement of gravity gradient.

As an example, the radiation intensity sensed by the detector may take the form of signals indicating the change of radiation intensity with time as shown in FIG. 8. As the retroreflectors experience free flight, the beams reflected from them are superimposed upon each other prior to striking the detector and a time-varying interference signal is obtained as shown in FIG. 8. If the gravity gradient is constant during the fall, then the difference in vertical velocities of the two retroreflector assemblies is given by $$v(t) = v_o + [l_o t (dg/dz)]$$

where $v_o$ is the initial velocity difference, $l_o$ is the distance between the two bodies at time $t = o$, and $dg/dz$ is the vertical gradient of gravity. Further, the frequency, $f$, of the interference signal is given by $$f(t) = 2v(t)/\lambda$$

where $\lambda$ is the wavelength of the radiation. Thus if the electronic pulse counter 31 of FIGS. 4 and 5 counts and records the number of signal cycles per predetermined time unit $t_1, t_2 ... t_n$, it is possible to plot signal frequency versus elapsed time as is done in FIG. 9. If the two retroreflecting assemblies in falling experience a constant vertical gradient of gravity, then this plot will be a straight line. The slope of this line is directly related to the vertical gradient of gravity.

The signal frequency depends only on the relative vertical velocity of the retroreflecting assemblies in free flight. For this reason the measurement of $dg/dz$ is inherently independent of the motion of the instrument frame, the energy source, the detector-preamplifier or the moving vehicle in which the instrument may be mounted during the free flight time of his retroreflectors.

Apparatus constructed according to this invention can be made in a number of different forms suitable for installation on an airplane, helicopter or ship. The apparatus may be constructed in a rugged form thus making it particularly suitable for all types of prospecting and field applications.

It will thus be seen that the objects set forth above, among those made apparent from the preceding description, are efficiently attained and, since certain changed may be made in the above constructions without departing from the scope of the invention, it is intended that all matter contained in the above description or shown in the accompanying drawings shall be interpreted as illustrative and not in a limiting sense.

We claim:

1. An apparatus for determining the vertical gradient of gravity from a moving platform, comprising in combination
    a. first retroreflecting means;
    b. second retroreflecting means;
    c. first and second holding means adapted initially to retain said first and second retroreflecting means at predetermined vertical levels relative to each other;
    d. means to release said retroreflecting means from said holding means in a predetermined timed sequence thereby to cause said first and second retroreflecting means to experience free flight;
    e. radiant energy source means;

f. radiant energy receiving means adapted to generate signals proportional to radiant energy received;

g. optical means adapted to direct said radiant energy to said radiant energy receiving means by way of said first and second retroreflecting means as they experience said free flight, said optical means including means to effect optical interference between the two beams of radiant energy reaching said radiant energy receiving means;

h. means to receive said signals from said radiant energy receiving means and to determine the temporal variations of intensity of the interfering reflected radiant energy beams;

i. housing means adapted to define a chamber enclosing said retroreflecting means, said holding means and said means to release said retroreflecting means; and j. angular deviation sensing means adapted to sense systematic angular deviation of said apparatus from a predetermined orientation and to develope error signals, said error signals being proportional to $\theta_l$ the angular deviation of the axis of said housing from local vertical in any direction, $\theta_{EW}$ the angular deviation in an East-West direction of the axis of said housing from the local vertical, and $d\theta_{EW}/dt$ the time rate of change of said angular deviation in an East-West direction;

k. horizontal stabilizing platform means supporting said housing means by providing 2 translational degrees of freedom for maintaining it in an essentially fixed relationship with respect to said retroreflecting means during free flight in spite of any acceleration or deceleration of the moving platform on which it is located;

l. supporting means adapted to impart 2 rotational degrees of freedom to said apparatus;

m. feedback means associated with said sensing means adapted to transmit said error signals to said supporting means whereby said systematic angular deviations are continuously minimized; and n. recording means adapted to record said error signals.

2. An apparatus in accordance with claim 1 wherein said supporting means is an actively stabilized platform.

3. An apparatus in accordance with claim 1 wherein said supporting means is a passively stable platform in which said sensing means and said feedback means are inherently a part thereof.

4. An apparatus in accordance with claim 3 wherein said passively stable platform is a pendulous suspension.

5. An apparatus for determining the vertical gradient of gravity from a moving platform, comprising in combination a. first retroreflecting means;

b. second retroreflecting means;

c. first and second holding means adapted initially to retain said first and second retroreflecting means at predetermined vertical levels relative to each other;

d. means to release said retroreflecting means from said holding means in a predetermined timed sequence thereby to cause said retroreflecting means to experience free flight;

e. radiant energy source means;

f. radiant energy receiving means adapted to generate signals proportional to radiant energy received;

g. optical means adapted to direct said radiant energy to said radiant energy receiving means by way of said first and second retroreflectors as they experience said free flight, said optical means including means to effect optical interference between the two beams of radiant energy reaching said radiant energy receiving means;

h. means to receive said signals from said radiant energy receiving means and adapted to determine the temporal variations of intensity of the interfering reflected radiant energy beams;

i. housing means adapted to define a chamber enclosing said retroreflecting means, said holding means and said means to release said retroreflecting means;

j. horizontal stabilizing means to impart 2 translational degrees of freedom to said housing means whereby said housing means will be maintained in a fixed relationship with respect to said retroreflecting means during free flight in spite of any acceleration or deceleration of the moving platform on which it is located, said stabilizing means comprising 1. a first platform supporting said housing means;
2. a second platform supporting said first platform on bearing means adapted to give said housing means free movement in a first direction;
3. a third platform supporting said second platform on bearing means adapted to give said housing means free movement in a second direction;
4. driving means to move said first platform in said first direction and said second platform in said second direction;
5. photodetecting means responsive to changes in the position of said housing in said first and second directions respective to said retroreflectors in free flight and adapted to generate signals proportional to said changes; and
6. means to transmit said signals to said driving means whereby said housing means will be maintained in said essentially fixed relationship;

k. systematic error sensing means adapted to sense angular deviation of said apparatus from a predetermined orientation and to develop error signals porporational to $\theta_l$, $\theta_{EW}$ and $d\theta_{EW}/dt$; and l. rotational stabilizing means adapted to apply said error signals to substantially isolate said apparatus from the forces giving rise to said systematic errors.

6. An apparatus in accordance with claim 5 wherein said rotational stabilizing means is a stabilized platform and said stabilized platform rests upon said moving platform.

7. An apparatus in accordance with claim 5 wherein said systematic error sensing means and said rotational stabilizing means are combined in a stable platform means.

8. An apparatus in accordance with claim 7 wherein said stable platform means is an actively stabilized platform.

9. An apparatus in accordance with claim 7 wherein said stable platform means is a pendulous suspension.

* * * * *